United States Patent [19]
Yamamori et al.

[11] Patent Number: 5,273,600
[45] Date of Patent: Dec. 28, 1993

[54] METHOD FOR ADHERING COMPONENT MATERIAL AND APPARATUS USED THEREFOR

[75] Inventors: Shuichi Yamamori; Sadao Kurashima; Itsuo Tanihara; Yasuhiko Kudou, all of Toyota, Japan

[73] Assignee: Sumitomo Rubber Industries, Ltd., Hyogo, Japan

[21] Appl. No.: 555,493

[22] PCT Filed: Jan. 12, 1990

[86] PCT No.: PCT/JP90/00030

§ 371 Date: Sep. 7, 1990

§ 102(e) Date: Sep. 7, 1990

[87] PCT Pub. No.: WO90/08031

PCT Pub. Date: Jul. 26, 1990

[30] Foreign Application Priority Data

Jan. 13, 1989 [JP] Japan .................................. 64-6720

[51] Int. Cl.⁵ .............................................. B29D 30/30
[52] U.S. Cl. ..................................... 156/133; 156/123; 156/134; 156/406.4; 156/408
[58] Field of Search ............... 156/111, 116, 123, 130, 156/130.3, 130.7, 133, 134, 396, 405.1, 406.4, 408, 421

[56] References Cited

U.S. PATENT DOCUMENTS

| | | | |
|---|---|---|---|
| 3,170,829 | 2/1965 | Batten | 156/405.1 |
| 3,407,106 | 10/1968 | Barefoot | 156/406.4 |
| 4,004,961 | 1/1977 | Takasuga et al. | |
| 4,473,427 | 9/1984 | Irie | 156/111 |
| 4,738,743 | 4/1988 | Satoh et al. | 156/405.1 |
| 4,840,697 | 6/1989 | Goodfellow et al. | 156/405.1 |
| 4,844,768 | 7/1989 | Kimura | 156/405.1 |
| 4,975,134 | 12/1990 | Mogi et al. | 156/133 |

FOREIGN PATENT DOCUMENTS

| | | |
|---|---|---|
| 57-105336 | 6/1982 | Japan . |
| 57-178839 | 11/1982 | Japan . |
| 57-178840 | 11/1982 | Japan . |
| 60-59140 | 12/1985 | Japan . |
| 61-22619 | 6/1986 | Japan . |
| 61-286124 | 12/1986 | Japan . |
| 63-256430 | 10/1988 | Japan . |
| 64-30737 | 2/1989 | Japan . |
| 1180330 | 7/1989 | Japan . |
| 1229618 | 9/1989 | Japan . |
| 1006367 | 9/1965 | United Kingdom . |

*Primary Examiner*—Geoffrey L. Knable

[57] ABSTRACT

A chuck (4) grasping the front edge or a tire component material (S) which is supplied from a material feeder (3) generates a motional locus through an initial ascending motion and through a forward motion toward the former and through a subsequent descending motion to the former to lay the front edge onto the carcass (T). A pressing mechanism (6) operates to press the introduced material (S) on the carcass (T), and concurrently the former (2) rotates by a predetermined rotation angle to adhere the tire component material (S) onto the carcass (T). Thereafter a cutter assembly (5) operates to cut the tire component material (S) in a length corresponding to the sum of a required length for joint and a full circumferential length of the carcass. The former (2) rotates again to adhere the tire component material (S) onto the full circumference of the carcass (T), and the front edge and a last edge of the tire component material are jointed by the pressing mechanism (6) so that the adhesion is completed. The method and the apparatus for adhering tire component material when compared with the manual work of the workers, enables a sharp improvement of the productivity to be made due to automation and no longer requires a high degree of worker's skill. Additionally, the quality of the products becomes stable and high, and the tire uniformity is improved.

17 Claims, 7 Drawing Sheets

METHOD FOR ADHERING COMPONENT MATERIAL AND APPARATUS USED THEREFOR

TECHNICAL FIELD

The present invention relates to a method employed in the building step of a green tire, in which the tire component material, such as a side wall, a breaker cushion, a cross ply tire tread and a bead apex, is adhered onto a carcass on a tire building former, and an apparatus used therefor.

BACKGROUND ART

In a green tire building step of a radial tire, particularly having a structure called tread-overside-wall construction (a structure in which in the cross section of the tire the edge of the tread layer is located over the top of the side wall layer and stacked on it), a cylindrical carcass is formed by adhering tire component materials thereof directly and successively onto the former first, and then the side wall material, for example, integratedly molded by extruding together with the clincher apex is adhered onto the carcass. Hitherto, this adhering work was manually done by workers, but the adhering work required a high degree of skill and the resulting quality was apt to be unstable and uneven because this adhering work was an adhesion of unflat material an unflat surface. Furthermore, the nature of the adhering work not only caused a problem that the uniformity of the tire was directly influenced but the nature itself became an unfavorable factor impeding the automation of the adhering operation.

A purpose of the present invention is to solve the problem of the above-mentioned conventional method for adhering a tire component material to provide a method and an apparatus used therefor which enable a worker to efficiently produce a green tire always having uniform quality regardless of his or her skill, experience or individuality.

DISCLOSURE OF THE INVENTION

The present invention employs the structural feature described below in order to solve the abovementioned problem.

Namely, according to the present invention, there is provided an adhering method for tire component material characterized in that a cylindrical carcass formed in advance is put onto a drum-shaped tire former having an outside circumferential length shorter than an inside circumferential length of the carcass, then, with the carcass being pressed against the former by a pressing mechanism both from above and from a sideward direction relative to the former surface, a front edge of the tire component material held by a suitable holder is drawn out and delivered onto the former and laid on the carcass attached onto the former, thereafter the former is rotated by a predetermined rotation angle with the tire component material being pressed against the carcass on the former by the pressing mechanism so that the tire component material is adhered onto the carcass, and the drawn out tire component material is cut off in a length corresponding to the sum of a full circumferential length of the carcass and a required length for joint, subsequently, the former is rotated again to complete adhesions of the tire component material onto the full circumference of the carcass and the front edge and a last edge of the tire component material are jointed by pressing and sticking by means of the pressing mechanism.

Furthermore, according to the present invention, there is provided an adhering method for tire component material characterized in that a cylindrical carcass formed in advance is put onto a collapsible drum-shaped former with a diameter reduced to provide a shorter outside circumferential length than an inside circumferential length of the carcass and then the diameter of the former is increased to bring the carcass and the drum outside circumference into close contact with each other, then with the carcass being pressed against the former by a pressing mechanism from above relative to the former surface a front edge of the tire component material held by a suitable holder is drawn out and delivered onto the former and laid on the carcass attached onto the former, thereafter the former is rotated by a predetermined rotation angle with the tire component material being pressed against the carcass on the former by the pressing mechanism so that the tire component material is wound and adhered onto the carcass, and the drawn out tire component material is cut off in a length corresponding to the sum of a full circumferential length of the carcass and a required length for joint, subsequently, the former is rotated again to complete adhering of the tire component material onto the full circumference of the carcass and the front edge and a last edge of the tire component material are jointed by pressing and sticking by means of the pressing mechanism.

The tire component material has a shape like a continuous belt, for example, and is held in a rolled-up form by the holder. This tire component material is paved out and delivered by required length, and then it is adhered onto the carcass and cut off. In this case, the front edge means, for example, the forward edge formed first by cutting off, the last edge means, for example, the backward edge formed by cutting off after the tire component material is paved out and the length for joint means the overlap width of the front edge and the last edge when the cut-off piece of the tire component material forms annulus along the outer circumference of the carcass.

In addition, according to the present invention there is provided an adhering apparatus, for tire component material, comprising a drum-shaped expandable and shrinkable former having an outside circumferential length shorter than an inside circumferential length of the carcass, a material feeder for supplying the tire component material toward the former, a chuck for grasping the front edge of the tire component material which is supplied from the material feeder to draw it out toward the former and for leading the front edge of the tire component material from above relative to the former to lay it on the carcass, a pressing mechanism for pressing the material introduced onto the former to press it onto the carcass, and a cutter assembly for cutting the tire component material adhered onto the former to cut it into the prescribed length.

Furthermore it is preferable that the adhering apparatus employs the following constructions: a construction in which the diameter of the drum-shaped former can be increased and reduced so that the former outside circumferential length can change from a shorter circumferential length than the carcass inside circumferential length to the same circumferential length as the carcass inside circumferential length and that the former outside circumferential length can change from the same circumferential length as the carcass inside circumferential length to a shorter circumferential length than the carcass inside circumferential length.

Furthermore it is preferable that the adhering apparatus employs the following constructions: a construction in which the material feeder includes a guide for leading the tire component material, the guide employs a roller conveyor and a pair of spaced transwheels located side-by-side adjacent to the upstream end of the roller conveyor, and the pair of transwheels are so inclined that the neighbouring sides of both transwheels are lowered and the other sides of them are elevated, and furthermore, at the lower side ends of the transwheels there are located guide plates to control the position in the width direction of the pair of tire component materials relative to each other which are passing on the roller conveyor in parallel.

Furthermore it is preferable that the adhering apparatus employs the following constructions: a construction in which the chuck generates a motional locus through an initial ascending motion grasping the front edge of the tire component material and a forward motion toward the former, and through a subsequent descending motion to the former.

Furthermore it is preferable that the adhering apparatus employs the following constructions: a construction in which the pressing mechanism comprises an upper pressing roller which presses the nearly full width of the outside circumferential surface of the former from above, a supplemental pressing roller which presses only right-hand and left-hand areas having a predetermined width of the outside circumferential surface of the former from above, and a pressing and sticking roller for clincher which presses clincher part of the carcass.

Furthermore it is preferable that the adhering apparatus employs the following constructions: a construction in which the pressing mechanism has a sideward pressing roller which presses against the outside circumferential surface of the former from a sideward direction relative to the former surface.

Furthermore it is preferable that the adhering apparatus employs the following constructions: a construction in which there is provided a sensor detecting the front edge of the tire component material adhered onto the carcass.

The chuck grasps the front edge of the tire component material fed by the material feeder and guides it to a position over the former onto which the carcass has been attached in advance, then the front edge is laid onto the carcass. The tire component material is pressed onto the carcass by the operation of the pressing mechanism and concurrently the former is rotated by a predetermined rotation angle so that the tire component material is adhered onto the carcass. After that, the cutter assembly is operated and the tire component material is cut off into a length corresponding to the sum of a full circumferential length of the carcass and a required length for joint. The former is rotated again and the adhesion of the tire component material on the full circumference of the carcass is completed and the front edge and the last edge are jointed by pressing and sticking by the pressing mechanism to complete the whole adhesion step.

Furthermore, according to the present invention, there is provided an adhering apparatus for the tire component material, which adheres the tire component material onto the carcass located on the drum-shaped former, characterized in that the apparatus employs a chuck comprising a support plate held by a frame capable of moving freely back and forth relative to the drum-shaped former, a press plate capable of grasping the tire component material in cooperation with the support plate, a lever enabling the support plate during the back and forth movement to move up and down along a predetermined path with a shaft of the support plate being slidingly in contact with a contour of the lever, and driving means which enable the press plate to move up and down relative to the support plate, and that the chuck grasps the front edge of the tire component material fed from the material feeder to deliver it forward the drum-shaped former and to guide and lay it onto the carcass from above relative to the former surface.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The present invention will become more fully understood from the detailed description given hereinbelow and the accompanying drawings which are given by way of illustration only, and thus are not limitative of the present invention, and wherein:

BEST MODE FOR PRACTICING THE INVENTION

The present invention is explained below with reference to an embodiment.

Figure 1A:
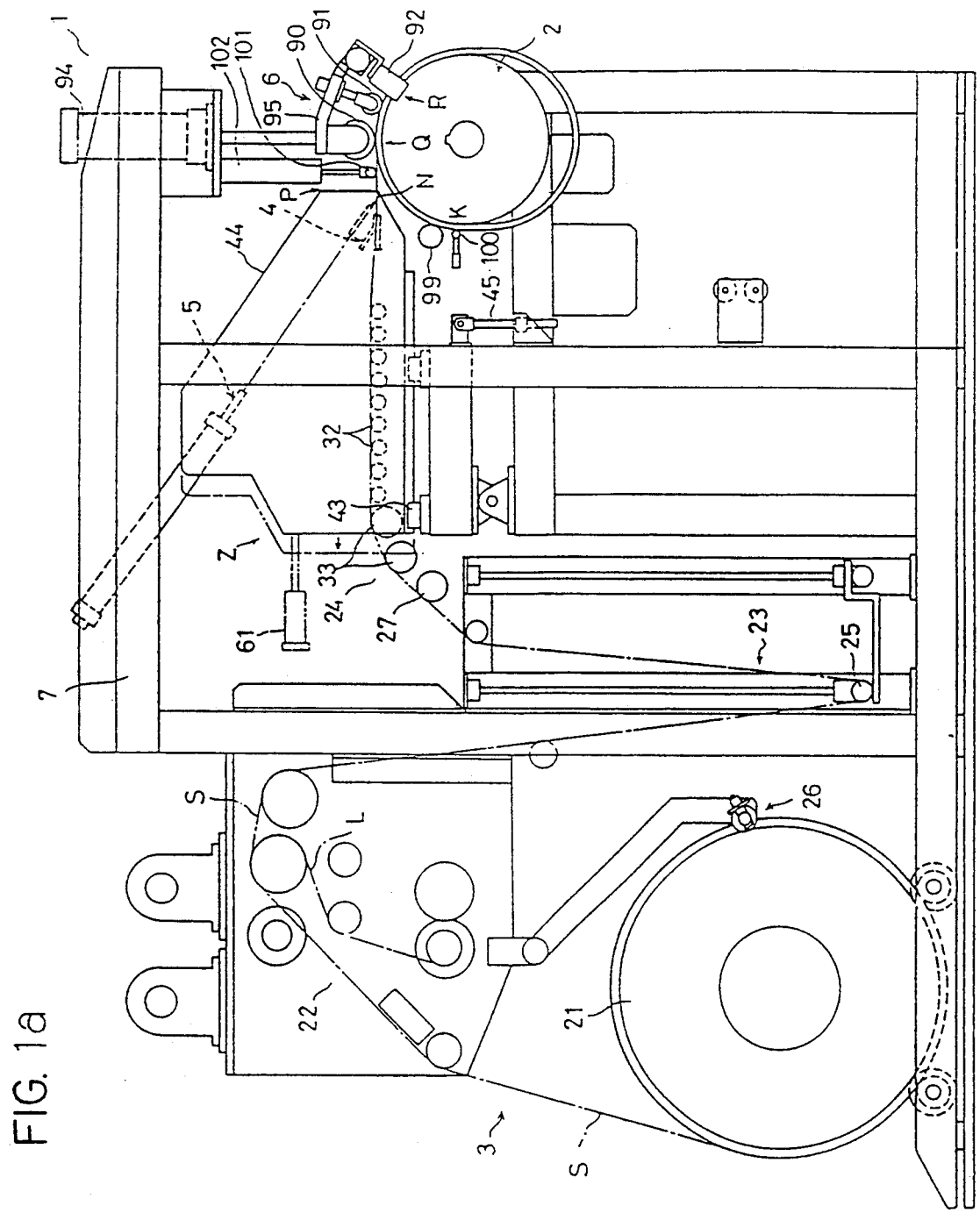
FIG. 1a is an overall front view showing an embodiment of the present invention.

As shown in FIG. 1a, the adhering apparatus 1 for tire component material, according to the present invention comprises a drum-shaped former 2, a material feeder 3, a chuck 4, a cutter assembly 5, a pressing mechanism 6 and so on, and the whole apparatus is set on a machine frame 7.

Figure 6B:
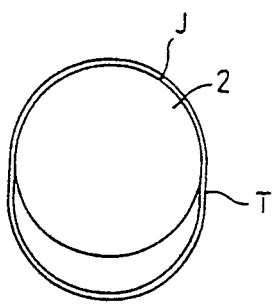
FIG. 6b and FIG. 6c are respectively front view and side view of the former showing the position of the joint part.
Figure 6C:
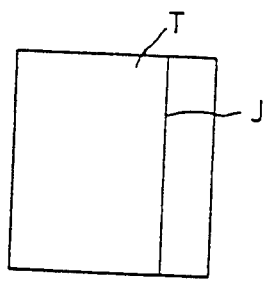
Figure 6A:
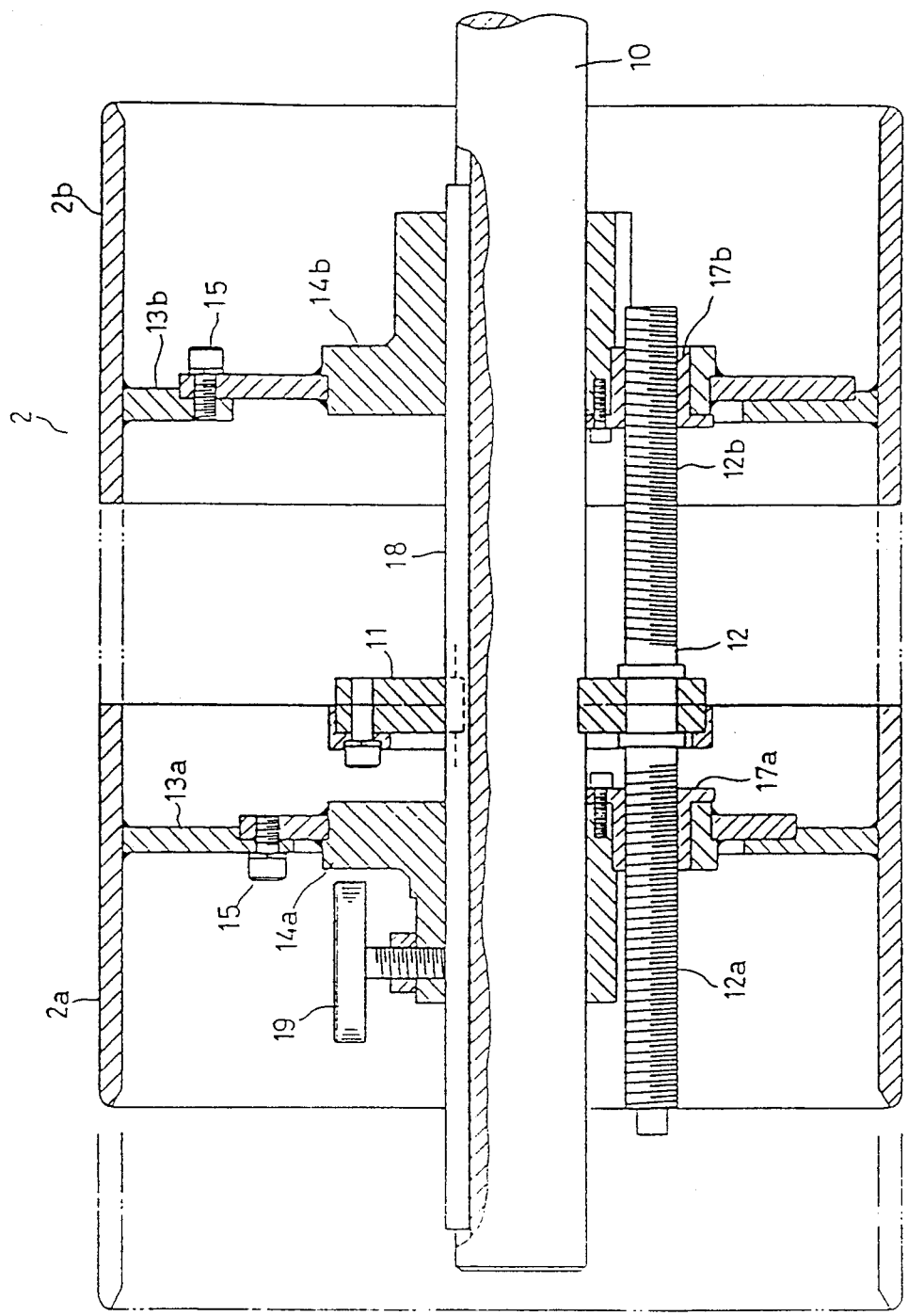
FIG. 6a is a sectional view of the former.

As shown in FIG. 6a, the former 2 is divided into a left drum 2a and a right drum 2b, and a bolt 12 to adjust the width of the former is attached to a flange 11 fixed to a common base shaft 10. Slidable members 14a, 14b slidably held by the base shaft 10 are fixed by means of a bolt 15 and the like to the inward flanges 13a, 13b of the left and right drums 2a, 2b. Nuts 17a, 17b attached to the slidable members 14a, 14b are engaged with the bolt 12. The bolt 12 has a left-handed thread portion at the left half part and a right-handed tread portion at the right half part. When the bolt 12 is rotated the right and left drums 2a, 2b move to become nearer or to become further apart relative to each other and thus the width of the former can be controlled suitably. In this drawing the numeral 18 represents a key and the numeral 19 represents a fixing bolt. With regard to the former 2, there may be employed a known former having a construction in which the former diameter can be increased and reduced so that the former outside circumferential length can change from a shorter circumferential length than the carcass inside circumferential length to the same circumferential length as the carcass inside circumferential length and that the former outside circumferential length can change from the same length as the carcass inside circumferential length to a shorter length than the carcass inside circumferential length.

As shown in FIG. 1a, the material feeder 3 comprises a holder 21 (a winding roll) holding the tire component material S (hereinafter, the explanation is made with reference to a sidewall as an example) in a wound form, a separator 22 for leading the material (sidewall) S drawn out from the holder and peeling a sheet-like liner L from the sidewall to wind the liner, a festune 23, the guide 24 and so on. The festune 23 has a traveling roller 25, and the up and down movement of which controls the drawn out length of the sidewall, S. The holder 21 is equipped with a sensor 26 deflecting the shortage of the material S.

Further, another set of the holder 21, the separator 22, the festune 23 and so on is provided to form respective pairs so as to supply a pair of right and left sidewalls S at a time.

Figure 5A:
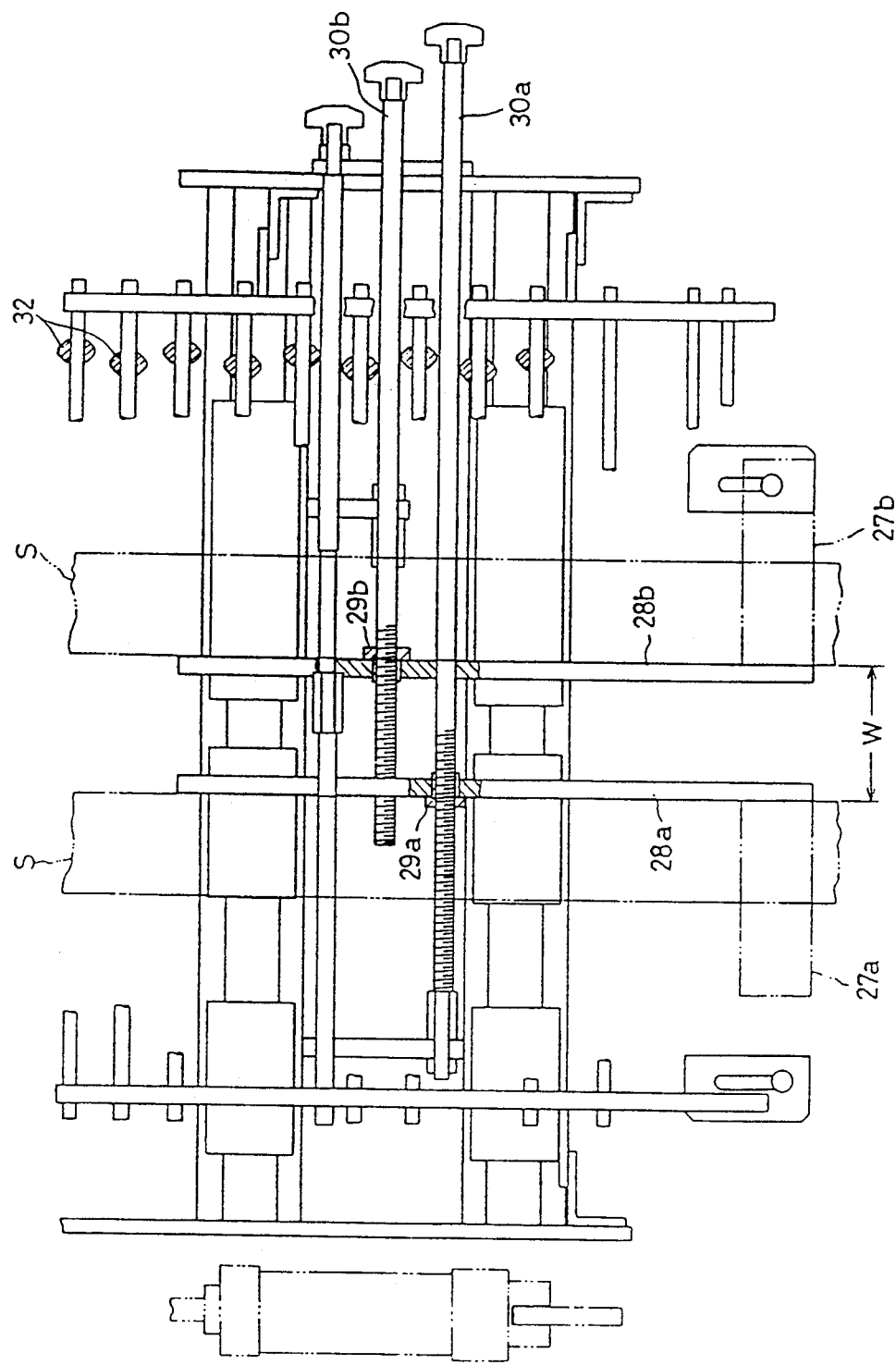
FIG. 5a is a plan view of the guide.
Figure 5B:
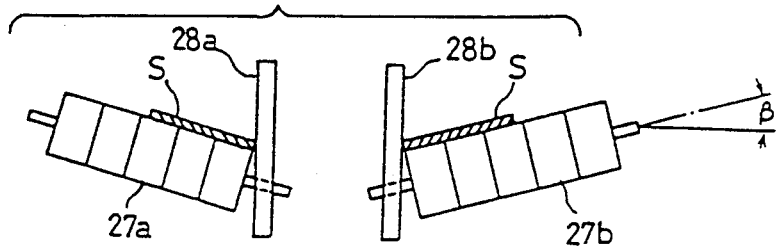
FIG. 5b is a side view of main part of the guide.

As shown in the FIG. 5a to FIG. 5b, the guide 24 includes a pair of left and right transwheels 27a, 27b located side-by-side having a space therebetween, and guide plates 28a, 28b are disposed adjacent to the neighboring ends opposing to each other of the transwheels 27a, 27b. The axis of the transwheels 27a, 27b are inclined by an angle $\beta$ so that the ends near the guide plates 28a, 28b are lowered. Thus the locations of the guide plates 28a, 28b determine the relative position in the lateral direction of the pair of sidewalls which pass in parallel keeping a prespecified space relative to each other on the transwheels and then on the later described roller conveyor 32, that is the relative interval W in the adhesion of the pair of sidewalls onto the carcass. Nuts 29a, 29b are attached to the left and right guide plates 28a, 28b and screw rods 30a, 30b are engaged with the nuts 29a, 29b. Rotation of these screw rods 30a, 30b can cause rightward and leftward movement of the guide plates 28a, 28b which are engaged with the screw rods, and consequently can adjust the position of the guide plates 28a, 28b.

A large number of tapered rollers are located on the left and right sides of the downstream area of the transwheels 27a, 27b, so that sidewalls S travel over them toward the former. The numeral 33 shown in the FIG. 1a represents a free roller synchronizing a delivery and a take-out with regard to the left and right sidewalls S.

Figure 2A:
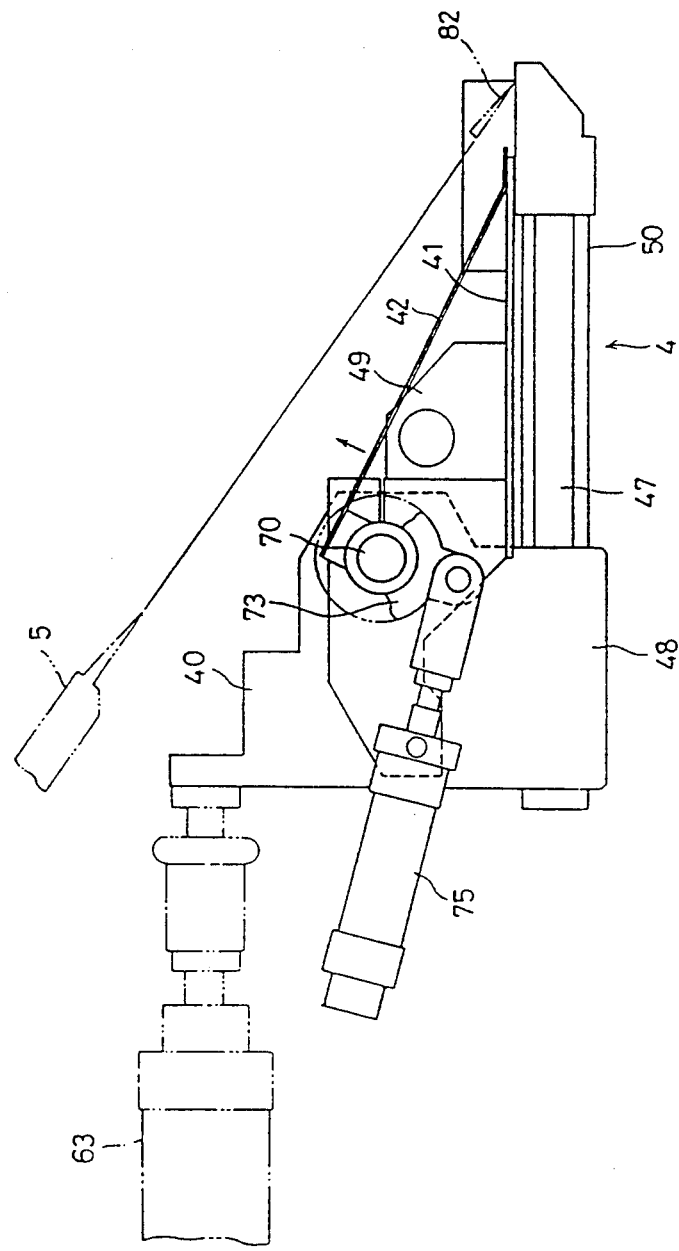
FIG. 2a is an explanatory view of the structure of the chuck.
Figure 2B:
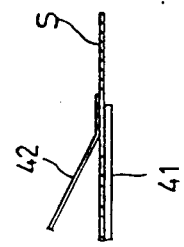
FIG. 2b is an explanatory view of the main part of the chuck.

As shown in the FIG. 2a to FIG. 2b, the chuck 4 comprises a support plate 41 and a press plate 42 attached to a frame 40, and is mounted on a base plate 44 which is supported slidably by liner guides 43, 43 attached to the machine frame 7 shown in the FIG. 1a. The height of the base plate 44 can be adjusted by means of a bolt 45. As shown in the FIG. 2a to FIG. 2b, another linear guide 48 is provided on the frame 40 in such a manner that the linear guide 48 can be engaged with a rail 47 arranged on the base plate 44 (refer to the FIG. 1a), and the frame 40 is supported slidably back and forth along the rail 47. The frame 40 has a cradle 50 against which the cutter abuts when cutting the material. On this cradle 50 the support plate 41 is located. The support plate 41 is equipped with an integratedly formed side plate 49.

Figure 3A:
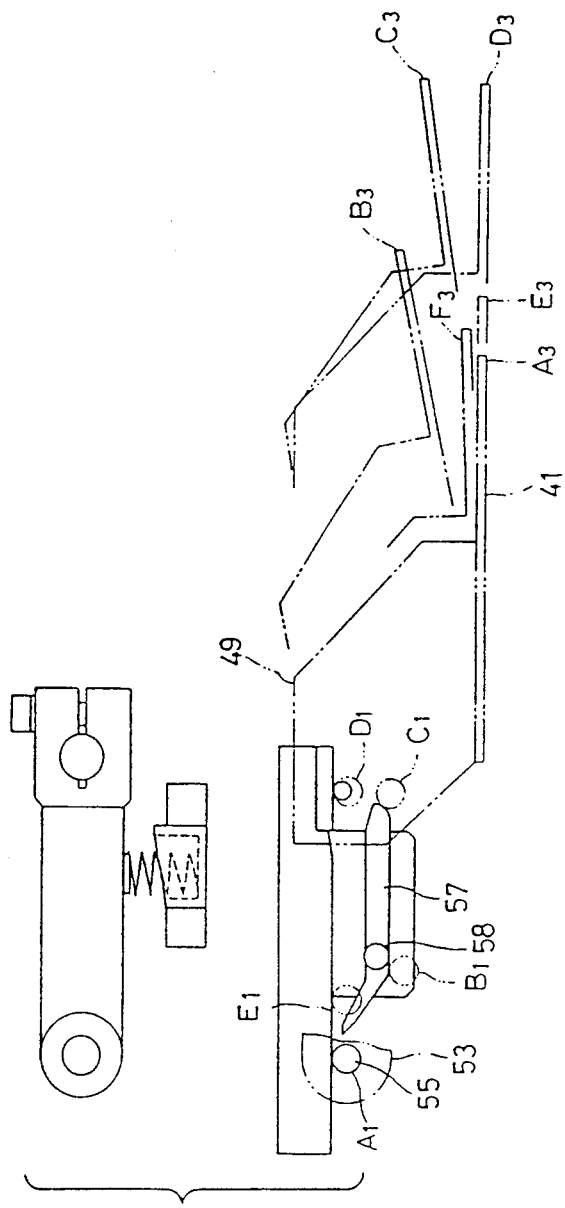
FIG. 3a is an explanatory view of the moving part of the chuck.
Figure 3B:
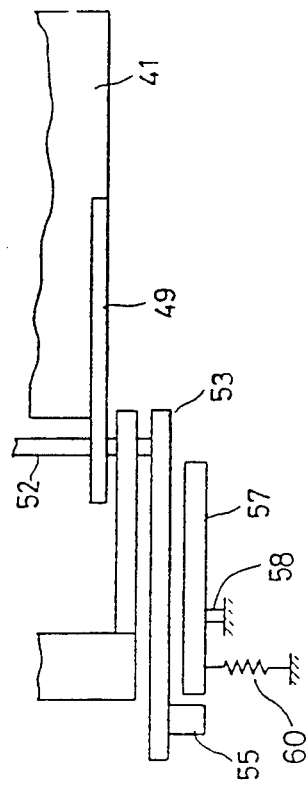
FIG. 3b is a plan view thereof.

As shown in the FIG. 3a to FIG. 3b, a shaft 52 is attached to the frame 40, and to the shaft 52 there are fixed the side plate 49 of the support plate and an outer plate 53 provided with a shaft 55 projecting therefrom. A dog-legged (a shape having upward inclined portion) lever 57 is pivotally supported around a shaft 58 on the base plate 44, so that the previously-mentioned shaft 55 moves along the contour of the lever 57 during the back and forth movement of the chuck 4. In addition, a force is applied on the lever 57 by a spring 60 so as to keep the condition shown in FIG. 3a.

The numeral 61 in the FIG. 1a represents a cylinder to cause the back and forth movement of the base plate 44, the numeral 63 in FIG. 2a represents another cylinder to cause the back and forth movement of the frame 40.

Figure 4:
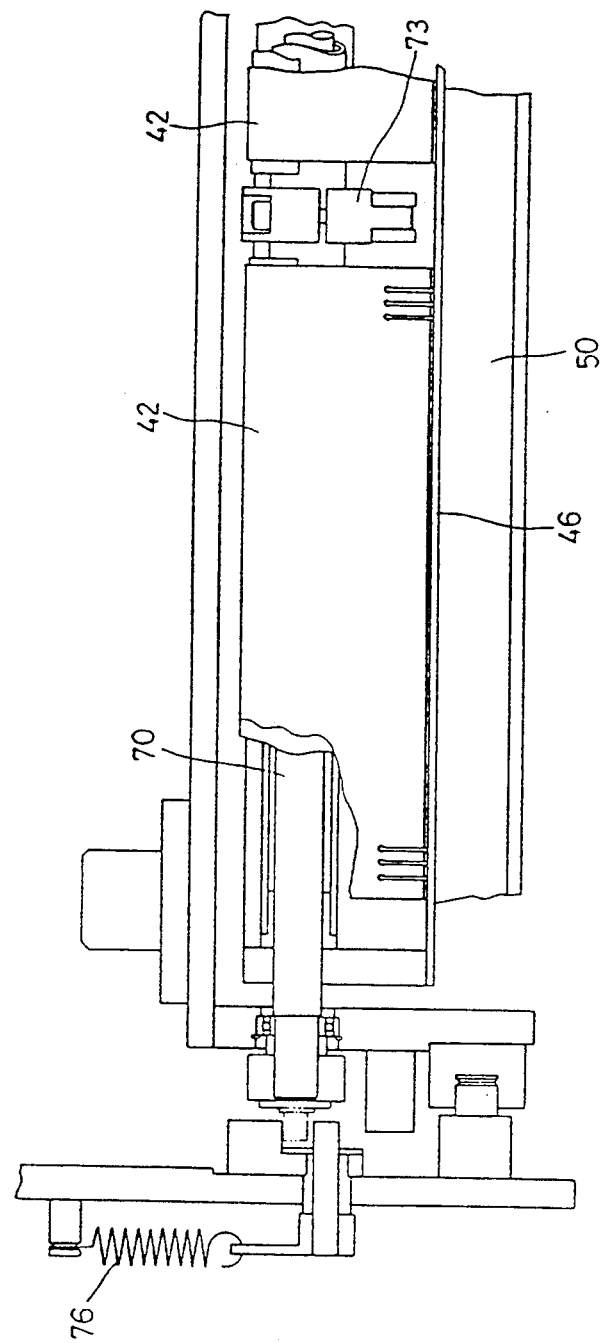
FIG. 4 is a side view of the chuck.

As shown in FIG. 2a, the fixed end of the press plate 42 is attached to a shaft 70, and as shown in FIG. 4, a rotary joint 73 is provided on the middle portion of the shaft 70. As shown in the FIG. 2a, a cylinder 75 is connected to the rotary jount 73 so as to enable the press plate 42 to be rotatively moved upward by extension of the cylinder 75, thereby the chuck can be opened. In addition, a force is applied on the press plate 42 by a spring 76 (refer to FIG. 4) along the shutting direction (a direction of downward rotation).

Figure 7:
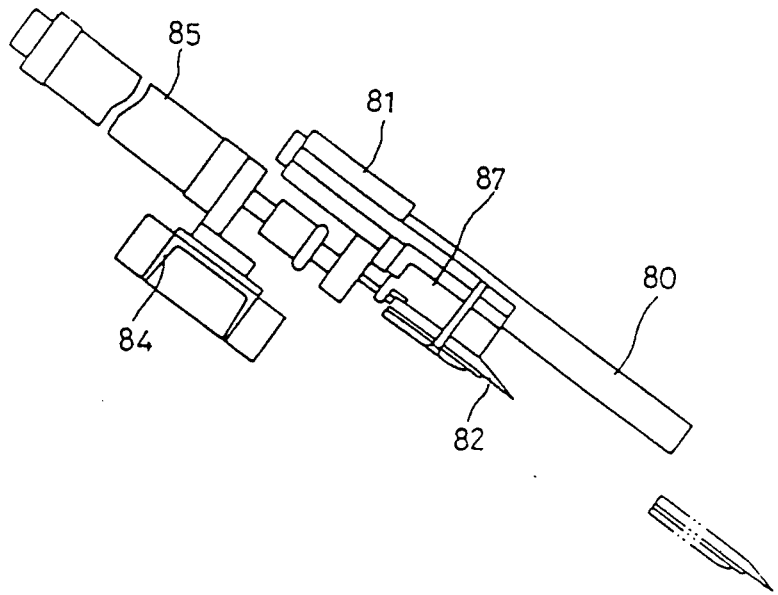
FIG. 7 is a front view of the cutter assembly.

As shown in FIG. 7, the cutter assembly 5 comprises a flat-plate-shaped cutter 82 attached to the slidable member 81 engaged with the linear guide 80 attached to the base plate 44 (refer to FIG. 1a), and a cylinder 85 which is supported by a bracket 84 fixed to the base plate 44 and has a piston rod connected to the slidable member 81. When this cylinder 85 is extended, the cutter 82 advances along a downwardly inclined direction and its edge reaches the upper surface of the cradle 50, as shown in the FIG. 2a. On the upper surface of the cutter 82 there is located a heater 87 which can always heat up the cutter at a temperature from about 200° to about 250° C.

As shown in the FIG. 1a, the pressing mechanism 6 comprises an upper pressing roller 90, as a main roller, a pair of left and right supplemental pressing rollers 91, 91 and a pair of left and right pressing-sticking rollers 92, 92 for clincher, and they are supported by a bracket 95 attached to a piston rod of a cylinder 94 disposed vertically above the former 2. The upper pressing roller 90 has a length almost equal to the full width of the former 2, and it presses against the full width of former 2 from above relative to the former surface. The supplemental pressing rollers 91, 91 are respectively located on the left-hand and right-hand sides of the outside circumferential surface of the former 2, and each of them presses only against a prescribed width i.e. the full width of the sidewall S. The pressing-sticking roller 92 for clincher, as shown in the FIG. 1b, presses diagonally a clincher C of a carcass T located on the side edge of the former 2. The roller 92 is made of urethane or the like and operated by telescopic motion of a cylinder supported by a linear guide engaged with a rail attached to the end of the bracket 95 (refer to FIG. 1a). In the FIG. 1a, on the upstream side relative to the upper pressing roller 90 there is provided a pair of additional pressing rollers 101, 101 for cutting operation, which are supported by a cylinder 102 and allowed to independently move up and down. As a pressing means in addition to the above-mentioned, a sideward pressing roller 99 is provided at the sideward position of the former. This pressing roller 99 is supported by the base plate 44 through a spring so as to contact and press the former 2 from the sideward direction relative to the former when the base plate 44 advances toward the former. Additionally, adjacent to this roller 99, there is located a sensor 100 capable of detecting the front edge of the sidewall S wound around the former 2.

The operation of the adhering apparatus 1 is explained below. First, the chuck 4 and cutter assembly 5 are retreated to the standby position. The relative interval W (refer to FIG. 5a) between the pair of the guide plates 28a, 28b in the guide 24 of the material feeder 3 is adjusted by means of the screw rods 30a, 30b, and subsequently the oblique angle $\beta$ (refer to FIG. 5b) of the pair of transwheels 27a, 27b is adjusted to a suitable angle.

A pair of sidewalls S, S are drawn out respectively from the holders 21, 21 and are led to the chuck 4 through the guide. Thereafter each front edge of them is held by the chuck formed by the support plate 41 and the press plate 42 (refer to FIG. 2b). In addition, the width of the former 2 is adjusted, in advance, by means of a rotation of the adjusting bolt 12 according to the width of the carcass to be applied on the former (refer to the FIG. 6a).

The cylindrical carcass (tire cover) which has been formed in advance in another place is put on the former 2. Since, the outside diameter of the former 2 is smaller than the inside diameter of the carcass on the former 2, the lower part of the carcass T on the former 2 hangs down a little (refer to FIG. 6b). As shown in FIGS. 6b to 6c, the ply joint part J is located in the top area or the bottom area when the carcass T is put on the former.

The base plate 44 is advanced by the operation of the cylinder 61 so that the chuck is located at the feeding position P adjacent to the upper part of the former. The cylinder 94 of the pressing mechanism 6 is operated at the same time as the approach of the base plate 44, and the upper pressing roller 90, the supplemental pressing rollers 91, 91 and the pressing-sticking rollers 92 for clincher are lowered so as to press the upper part of the carcass T on the former. Additionally, the sideward roller 99 is also advanced by the advance of the base plate 44, and as a result it contacts and presses the carcass T from the sideward direction relative to the former. Subsequent to the above step, the former 2 is rotated clockwise in FIG. 1 by the angle of 90 degrees and then stopped. The carcass T gets to fit the former 2 through this operation. Next, the cylinder 94 is operated to lift back the upper roller 90 to the standby position.

The cylinder 63 is operated so that the chuck part (the support plate 41 and the press plate 42 shown in FIG. 2b) holding the front edge of the sidewall S is further advanced. During this operation the shaft 55 projecting from the outer plate 53 shown in FIGS. 3a to 3b moves along the contour of the lever 57 through a route, shown in the FIG. 3a, $A_1 - B_1 - C_1 - D_1 - E_1$ in this order keeping in contact with the lever 57. So, corresponding to this movement of the shaft 55, the edge of the support plate 41 moves through a route $A_3 - B_3 - C_3 - D_3 - E_3$ in this order. As a result, the front edge of the sidewall S held by the chuck part moves generating a particular motional locus comprising a rising path, an advancing path and a falling path, and then placed onto the carcass on the former. The specific shape of the lever 57 (i.e. a cam) enables the movement of the chuck part to become a serial continuous motion, so the movement becomes faster and the mechanism can be simplified compared with a conventional apparatus using a cylinder or the like.

On the other hand, the cylinder 94 is operated at the same time as the afore-mentioned further advance of the chuck part so that the upper pressing roller 90, the supplemental pressing rollers 91, 91 and the pressing-sticking rollers 92, 92 for clincher are downwardly moved to press the respective front edges of the pair of sidewalls S placed at the position Q on the carcass. Concurrently, the cylinder 75 shown in FIG. 2a is extended to rotate the press plate 42 of the chuck part upward against the force of the spring so that the sidewalls are released from restraint and additionally the cylinder 63 is contracted so that the chuck 4 retreats and returns to the standby position.

Figure 1B:
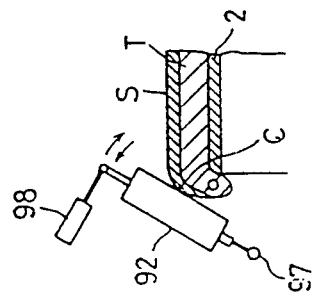
FIG. 1b is a side view of a main part of the pressing mechanism showing the operation thereof.

In FIG. 1a, the former 2 begins to rotate, and the pressing-sticking roller 92 for clincher is advanced by the operation of the cylinder 98 just after the front edge of the sidewall passes the position R where the roller 92 is located. Thus, as shown in FIG. 1b the roller 92 presses and sticks the sidewall S onto the bead portion B in the clincher area C.

Then the former 2 is further rotated, and when the front edge of the sidewall comes to the position K, the front edge is detected by the sensor 100. From this rotational posture, the former 2 is further rotated by an angle corresponding to a given number of pulse set in advance by means of a counter, and then the former 2 is stopped. Thereby, the precise control of the joint length is achieved. At this stage, the length of the sidewall from the front edge to the position N where the sidewall is to be cut (i.e. prespecified dimension) is equal to the sum of the carcass outside circumferential length and the length for the overlap joint.

The cylinder 75 shown in FIG. 2a is contracted and then the press plate 42 of the chuck part is lowered by virtue of the force of the spring so as to hold and restrain the sidewall S at a position slightly behind the cut-off position.

The pair of the left and right additional pressing rollers 101, 101 for cutting operation are lowered by the operation of the cylinder 102 shown in FIG. 1a so as to press and fix the sidewall which has been strained between the chuck part and the upper pressing roller 90. Concurrently, the cutter 82 is advanced by the operation of the cylinder 85 shown in FIG. 7. In this manner both left and right sidewalls are cut into the prespecified length at the position N. After the cutting operation, the cutter 82 is returned along an upwardly inclined direction to the standby position and also the additional pressing roller 101 for cutting operation is returned upward to the standby position.

The joint of the front and last edges of the sidewall is formed by overlapping those edges, and the rotation of the former 2 is stopped just after the formed joint goes through the pressing of the upper pressing roller 90. Thereafter the former 2 begins to rotate in the reverse direction and this reverse rotation is stopped after the joint part goes through in the reverse direction the pressing of the upper pressing roller 90. Thereby, the joint part is pressed and sticked firmly enough to prevent separation. With regard to the pressing-sticking roller 92 for bead shown in FIG. 1b, the roller 92 is retreated by the operation of the cylinder 98 before the former 2 begins to rotate in the reverse direction.

The cylinder 94 is operated so that the upper pressing roller 90, the supplemental pressing roller 91, the pressing-sticking roller 92 for clincher, the additional pressing roller 101 for cutting operation and the like are lifted and returned to the respective standby positions. Further, the whole base plate 44 is retreated and returned to the standby position Z by the operation of the cylinder 61. At this time, the sideward pressing roller 99 also returns together with the base plate 44 to the standby position apparent from the former.

The present invention is explained hereinafter with reference to the embodiment wherein the sidewall is adhered onto the carcass, but it is readily understandable that the present invention can be applied to the step in which only a breaker cushion is adhered or to the step for adhesion of a cross ply tire tread. Further, as a sensor 100 detecting the front edge of the sidewall, a non-contact sensor such as a photoelectric type sensor, a capacitance type sensor or the like can be used instead of a limit switch. Furthermore, with regard to a pressing roller, a laminate-type roller wherein plural disks are inlaid on the surface of a sponge through which a center shaft is penetrated can be employed. Similarly, with respect to the cutter there can be employed a rotary cutter having edges along its outside circumference the rotation of which provides cutting, instead of a hot knife like the knife employed in the illustrated example which is heated-up in use. The rotary cutter provides an advantage that cutting can be carried out without heating.

As explained above, the method and the apparatus for adhering tire component material according to the present invention, compared with the manual work of the workers, enables a sharp improvement of the productivity to be made due to automation and no longer requires a high degree of worker's skill.

Additionally, the quality of the products becomes stable and high, and the tire uniformity is improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method for adhering tire component material comprising the following steps:
    placing a generally cylindrical carcass formed in advance on a drum-shaped former, the drum-shaped former having an outside circumference length which is shorter than an inside circumference length of the carcass;
    pressing the carcass against the former with a pressing mechanism both from above and from a sideward direction relative to the former;
    providing a cam having a dog-legged shape;
    drawing out a front edge of the tire component material by a chuck and delivering the front edge of the tire component material onto the carcass on the former, the chuck being operatively connected to a shaft engaged with the cam, the drawing out and delivering further comprising the steps of:
        holding the tire component material with the chuck,
        raising the chuck with the front edge of the tire component material,
        advancing the chuck with the tire component material toward the former,
        lowering the chuck with the tire component material toward the former,
        releasing the tire component material from the chuck, and
        moving the chuck away from the former,
        the steps of raising, advancing and then lowering of the chuck resulting from the shaft operatively connected to the chuck following an outer periphery of the cam;
    rotating the former with the tire component material and carcass by a predetermined rotational angle while pressing the tire component material against the carcass on the former by the pressing mechanism in order to adhere the tire component material onto the carcass;
    cutting the tire component material drawn out in a length corresponding to a sum of a full circumferential length of the carcass and a required length for a joint;
    rotating the former to complete adhering of the tire component material onto the full circumference of the carcass; and
    joining the front edge of the tire component material to a rear edge of the tire component material by the pressing mechanism pressing and sticking the front and rear edges of the tire component material during rotation of the former.

2. The method of claim 1, wherein before the step of drawing out a front edge of the tire component material, the former is rotated ninety degrees so that the carcass is fit to the former before the tire component material is delivered to the carcass on the former.

3. The method of claim 1, further comprising the step of sensing the front edge of the tire component material on the carcass during the step of rotating the former in the first direction to ensure the length drawn out of the tire component material corresponds to the sum of the full circumferential length of the carcass and the required length of the joint.

4. The method of claim 1, further comprising the steps of; engaging a portion of the tire component material near the rear edge thereof with pressing rollers before the step of cutting in order to hold the tire component material;
    lowering a cutting mechanism to cut the tire component material during the step of cutting;
    raising the cutting mechanism away from the tire component material after the step of cutting; and
    disengaging the pressing rollers from the tire component material after the step of cutting.

5. A method for adhering tire component material comprising the following steps:
    placing a generally cylindrical carcass formed in advance on a drum-shaped former, the drum-shaped former having an outside circumferential length which is shorter than an inside circumferential length of the carcass;
    increasing diameter of the former after the carcass is placed thereon to thereby bring the carcass and the former into close contact;

pressing the carcass against the former with a pressing mechanism from above relative to the former;

providing a cam having a dog-legged shape;

drawing out a front edge of the tire component material by a chuck and delivering the front edge of the tire component material onto the carcass on the former, the chuck being operatively connected to a shaft engaged with the cam, the drawing out and delivering further comprising the steps of holding the tire component material with the chuck, raising the chuck with the front edge of the tire component material, advancing the chuck with the tire component material toward the former, lowering the chuck with the tire component material toward the former, releasing the tire component material from the chuck, and moving the chuck away from the former, the steps of raising, advancing and then lowering of the chuck resulting from the shaft operatively connected to the chuck following an outer periphery of the cam;

rotating the former with the tire component material and carcass by a predetermined rotational angle while pressing the tire component material against the carcass on the former by the pressing mechanism in order to adhere the tire component material onto the carcass;

cutting the tire component material drawn out in a length corresponding to a sum of a full circumferential length of the carcass and a required length for a joint;

rotating the former to complete adhering of the tire component material onto the full circumference of the carcass; and joining the front edge of the tire component material to a rear edge of the tire component material by the pressing mechanism pressing and sticking the front and rear edges of the tire component material during rotation of the former.

6. An apparatus for adhering tire component material comprising:

an expandable and shrinkable drum-shaped former which initially receives a carcass, the former having an outside circumferential length which is shorter than an inside circumferential length of the carcass at least when the former is shrunk;

a material feeder for supplying the tire component material toward the former;

a dog-legged shape cam;

chuck means for grasping a front edge of the tire component material supplied by the material feeder, for drawing the tire component material out toward the former and for leading the front edge of the tire component material from a position relatively above the former to a position in which the front edge of the tire component material is laid on the carcass on the former, the chuck means being operatively connected to a shaft engaged with the cam, the chuck means generating a motional locus in response to the shaft following an outer periphery of the cam such that the chuck means moves from a starting position through an initial ascending motion grasping the front edge of the tire component material, a forward motion toward the former, a descending motion toward the former and a rearward motion away from the former to thereby return to the starting position, the chuck means releasing the tire component material before the rearward motion;

a pressing mechanism for pressing the tire component material introduced onto the carcass on the former to press the tire component material onto the carcass both from above and in a sideward direction relative to the former; and a cutter assembly for cutting the tire component material such that a length corresponding to a sum of a full circumferential length of the carcass and a required length for a joint is provided to the former.

7. The apparatus of claim 6, wherein diameter of the former can be increased and reduced so that the former outside circumferential length can change from a shorter circumferential length than the carcass inside circumferential length to a length generally the same as the inside circumferential length of the carcass and the former outside circumferential length can change form generally the same length as the carcass inside circumferential length to a shorter circumferential length than the carcass inside circumferential length.

8. The apparatus of claim 6, wherein the material feeder includes a guide for leading the tire component material, the guide having a roller conveyor and a pair of spaced transwheels located side-by-side adjacent to an upstream end of the roller conveyor, the pair of transwheels are so inclined that sides of the transwheels closest to one another are lower and the other sides of the transwheels are elevated, at the lower sides of the transwheels there are located guide plates to control positioning in a width direction of a pair of tire component materials relative to each other which are passing on the roller conveyor generally in parallel.

9. The apparatus of claim 6, wherein the pressing mechanism comprises an upper pressing roller which presses nearly a full width of an outside circumferential surface of the former from above, a supplemental pressing roller which presses only right-hand and left-hand areas having a predetermined width of the outside circumferential surface of the former from above, and a pressing-sticking roller for a clincher which presses a clincher part of the carcass.

10. The apparatus of claim 9, further comprising a bracket and a piston and cylinder, the piston being attached to the bracket and the upper pressing roller, the supplemental pressing roller and the pressing-sticking roller being mounted on the bracket, the bracket with the rollers being vertically movable toward and away from the former by the piston and cylinder in order for the rollers to engage and disengage the carcass and the tire component material.

11. The apparatus of claim 10, further comprising means mounted on the bracket for moving the pressing-sticking roller toward and away from the former in a sidewise direction, the pressing-sticking roller being pivoted about a pivot by the means for moving.

12. The apparatus of claim 6, claim 9 or claim 11, wherein the pressing mechanism further comprises a sideward pressing roller, the sideward pressing roller pressing against the outside circumferential surface of the former from a sideward direction relative to the former surface.

13. The apparatus of claim 12, wherein the sideward pressing roller is operatively attached to the chuck means and is movable therewith toward and away from the former.

14. The apparatus of claim 6, further comprising a sensor for detecting the front edge of the tire component material adhered to the carcass.

15. The apparatus of claim 14, wherein the sensor is located adjacent the former, the sensor detects the front edge of the tire component material before the tire component material completely encircles the carcass.

16. The apparatus of claim 6, wherein the chuck means comprises a rotatable press plate and a support plate attached to a movable frame, the tire component material being fed between the press plate and the support plate and the press plate being movable toward and away from the support plate, when the press plate is in a first position adjacent the support plate, the tire component material is held between the support plate and the press plate and when the press plate moves to a second position away from the support plate, the tire component material is free to move past the support plate and press plate.

17. The apparatus of claim 11, wherein the shaft is a first shaft and wherein the apparatus further comprises a side plate, an outer plate, and a second shaft, the frame being attached to the second shaft which is fixed to the side plate, the outer plate having the first shaft affixed thereto and the outer plate being connected to the second shaft, the first shaft being movable around the outer periphery of the cam.

* * * * *

UNITED STATES PATENT AND TRADEMARK OFFICE
CERTIFICATE OF CORRECTION

PATENT NO. : 5,273,600
DATED : December 28, 1993
INVENTOR(S) : Shuichi Yamamori et al.

It is certified that error appears in the above-indentified patent and that said Letters Patent is hereby corrected as shown below:

On the title page, Item [54] and Column 1, line 1, , insert --TIRE-- after "ADHERING"

Signed and Sealed this

Fourteenth Day of June, 1994

Attest:

Attesting Officer

BRUCE LEHMAN

Commissioner of Patents and Trademarks